US010424954B2

(12) United States Patent
Zhang

(10) Patent No.: US 10,424,954 B2
(45) Date of Patent: Sep. 24, 2019

(54) POWER ADAPTOR, TERMINAL AND CHARGING SYSTEM

(71) Applicant: GUANGDONG OPPO MOBILE TELECOMMUNICATIONS CORP., LTD., Dongguan (CN)

(72) Inventor: Jialiang Zhang, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 15/311,793

(22) PCT Filed: Nov. 11, 2014

(86) PCT No.: PCT/CN2014/090845
§ 371 (c)(1),
(2) Date: Nov. 16, 2016

(87) PCT Pub. No.: WO2016/074158
PCT Pub. Date: May 19, 2016

(65) Prior Publication Data
US 2017/0279286 A1 Sep. 28, 2017

(51) Int. Cl.
*H02J 7/00* (2006.01)
*H02J 7/04* (2006.01)
*H04B 3/54* (2006.01)

(52) U.S. Cl.
CPC .......... *H02J 7/0045* (2013.01); *H02J 7/0029* (2013.01); *H02J 7/0042* (2013.01); *H02J 7/04* (2013.01);
(Continued)

(58) Field of Classification Search
CPC ...... H02J 7/0045; H02J 7/0042; H02J 7/0029; H02J 7/04; H04B 3/54
(Continued)

(56) References Cited

U.S. PATENT DOCUMENTS 4,811,154 A * 3/1989 Trenkler .............. G01R 31/088
361/79
5,541,489 A * 7/1996 Dunstan ............. G01R 31/3624
320/134
(Continued)

FOREIGN PATENT DOCUMENTS

CN 202268816 U 6/2012
CN 102957193 A 3/2013
(Continued)

OTHER PUBLICATIONS

Chinese Patent Application No. 201480075503.3 First Office Action dated Aug. 7, 2017 with English translation, 12 pages.
(Continued)

*Primary Examiner* — Robert Grant
*Assistant Examiner* — John T Trischler
(74) *Attorney, Agent, or Firm* — Lathrop Gage LLP

(57) ABSTRACT

A power adaptor (100) includes a power conversion unit (110) and a power line (121). The power conversion unit (110) charges a terminal (200) via the power line (121). The power adaptor (100) further includes a communication unit (130) and a data line (122). When the power adaptor (100) is coupled to the terminal (200), the communication unit (130) communicates with the terminal (200) via the data line (122). The power adaptor (100) charges the terminal (200) still using the power line (121). Furthermore, when the power adaptor (100) is coupled to the terminal (200), the power adaptor (100) communicates with the terminal via the data line (122). Compared with the method of data and power time-division multiplexing the power line, the heating phenomenon of the power line caused by an excessively high load of a signal isolation unit can be effectively avoided.

16 Claims, 3 Drawing Sheets

(52) U.S. Cl.
CPC ........ *H04B 3/54* (2013.01); *H02J 2007/0001* (2013.01); *H02J 2007/0037* (2013.01); *H02J 2007/0039* (2013.01); *H02J 2007/0096* (2013.01); *H02J 2007/0098* (2013.01)

(58) Field of Classification Search
USPC .......................................................... 320/106
See application file for complete search history.

(56) References Cited

U.S. PATENT DOCUMENTS

| | | | | |
|---|---|---|---|---|
| 5,617,003 A * | 4/1997 | Odachi | B60L 11/182 | 320/108 |
| 5,656,917 A * | 8/1997 | Theobald | H01M 10/44 | 320/106 |
| 5,767,781 A * | 6/1998 | Yavelberg | G01R 31/025 | 340/661 |
| 6,097,175 A * | 8/2000 | Yoon | H02J 7/0004 | 320/130 |
| 6,873,135 B2 * | 3/2005 | Nakatsuji | G01R 31/3624 | 320/132 |
| 7,145,439 B2 * | 12/2006 | Darshan | G06F 1/3209 | 340/12.32 |
| 7,461,194 B2 * | 12/2008 | Ohara | G06F 13/28 | 710/305 |
| 7,495,416 B2 * | 2/2009 | Sato | H02J 7/0031 | 320/134 |
| 7,531,986 B2 * | 5/2009 | Eager | H02J 7/0068 | 320/110 |
| 7,615,965 B2 * | 11/2009 | Popescu-Stanesti | H02J 1/08 | 307/46 |
| 7,906,937 B2 * | 3/2011 | Bhade | B60L 11/1824 | 320/104 |
| 7,977,919 B1 * | 7/2011 | Jaoude | H04B 1/06 | 320/129 |
| 8,013,568 B2 * | 9/2011 | Park | H02J 7/025 | 320/108 |
| 8,022,662 B2 * | 9/2011 | Eager | H02J 7/0068 | 320/103 |
| 8,072,184 B2 * | 12/2011 | Bhade | B60L 11/1824 | 320/104 |
| 8,169,189 B2 * | 5/2012 | Eto | H01M 10/443 | 320/112 |
| 8,234,509 B2 * | 7/2012 | Gioscia | G06F 1/1632 | 713/300 |
| 8,261,100 B2 * | 9/2012 | Paniagua, Jr. | G06F 1/26 | 320/114 |
| 8,300,666 B2 * | 10/2012 | Karam | H02J 13/0048 | 307/28 |
| 8,358,107 B2 * | 1/2013 | Nguyen | H02J 7/0052 | 320/128 |
| 8,386,814 B2 * | 2/2013 | Tom | G06F 1/266 | 307/151 |
| 8,432,136 B2 * | 4/2013 | Ashida | H01M 10/443 | 320/152 |
| 8,527,688 B2 * | 9/2013 | Chatterjee | G06F 1/1632 | 336/221 |
| 8,536,837 B1 * | 9/2013 | Jaoude | H04B 1/06 | 320/129 |
| 8,541,986 B2 * | 9/2013 | Hiraoka | H01M 10/0525 | 320/162 |
| 8,686,682 B2 * | 4/2014 | Eager | H02J 7/0068 | 320/103 |
| 8,810,192 B2 * | 8/2014 | Bridges | G06Q 50/06 | 320/107 |
| 8,860,368 B2 * | 10/2014 | Ohtomo | B60L 3/0069 | 320/109 |
| 8,892,912 B2 * | 11/2014 | Lai | G06F 1/266 | 713/300 |
| 8,994,321 B2 * | 3/2015 | Knowlton | H02J 7/007 | 320/106 |
| 9,018,918 B2 * | 4/2015 | Nguyen | H02J 7/0052 | 320/138 |
| 9,113,017 B2 * | 8/2015 | Ishikawa | H04N 1/00204 | |
| 9,153,984 B2 * | 10/2015 | Ono | H02J 7/0042 | |
| 9,252,615 B2 * | 2/2016 | Chen | H02J 7/0052 | |
| 9,274,577 B2 * | 3/2016 | Lai | G06F 1/266 | |
| 9,321,350 B2 * | 4/2016 | Yokoyama | H01M 10/44 | |
| 9,395,778 B2 * | 7/2016 | Fritchman | G06F 1/26 | |
| 9,424,122 B2 * | 8/2016 | Dolfi | H04L 43/00 | |
| 9,438,064 B2 * | 9/2016 | Keeling | H02J 50/80 | |
| 9,444,278 B2 * | 9/2016 | Baurle | G06F 13/4282 | |
| 9,488,997 B1 * | 11/2016 | Dwelley | G05F 1/462 | |
| 9,496,726 B2 * | 11/2016 | Frid | H02J 7/0021 | |
| 9,584,016 B2 * | 2/2017 | Motoki | H02M 3/33523 | |
| 9,651,593 B2 * | 5/2017 | Sims | H02J 7/042 | |
| 9,669,723 B2 * | 6/2017 | Sugeno | B60L 3/0046 | |
| 9,711,983 B2 * | 7/2017 | Winger | H02J 7/0052 | |
| 9,787,112 B2 * | 10/2017 | Sukup | H02J 7/0052 | |
| 9,789,779 B2 * | 10/2017 | Shimizu | B60L 11/184 | |
| 9,893,540 B2 * | 2/2018 | Zhang | H02J 7/04 | |
| 9,899,848 B2 * | 2/2018 | Hu | H02J 7/0036 | |
| 9,899,854 B2 * | 2/2018 | Wei | H02J 3/14 | |
| 9,935,490 B2 * | 4/2018 | Zhang | H02J 7/0031 | |
| 9,985,449 B2 * | 5/2018 | Zhang | G06F 1/206 | |
| 9,997,933 B2 * | 6/2018 | Huang | H02J 7/0055 | |
| 9,998,611 B2 * | 6/2018 | Zhang | H01M 10/44 | |
| 10,033,204 B2 * | 7/2018 | Huang | H02J 7/0055 | |
| 10,044,204 B2 * | 8/2018 | Hu | H02J 7/0052 | |
| 10,050,452 B2 * | 8/2018 | Zhang | H02J 7/0036 | |
| 10,050,466 B2 * | 8/2018 | Hu | H02J 7/022 | |
| 10,056,779 B2 * | 8/2018 | Hu | H02J 7/045 | |
| 10,090,700 B2 * | 10/2018 | Zhang | H02J 7/0027 | |
| 10,097,032 B2 * | 10/2018 | Hu | H02J 7/0006 | |
| 10,116,157 B2 * | 10/2018 | Lei | H01M 10/44 | |
| 10,122,190 B2 * | 11/2018 | Zhang | H02J 7/02 | |
| 10,122,201 B2 * | 11/2018 | Zhang | H02J 7/0027 | |
| 10,141,766 B2 * | 11/2018 | Zhang | H02J 7/0027 | |
| 10,189,360 B2 * | 1/2019 | Ohtomo | B60L 11/1816 | |
| 10,205,332 B2 * | 2/2019 | Lei | H02J 7/0047 | |
| 10,211,656 B2 * | 2/2019 | Zhang | H02J 7/00 | |
| 10,224,725 B2 * | 3/2019 | Zhang | H02J 7/04 | |
| 10,270,269 B2 * | 4/2019 | Zhang | H02J 7/0044 | |
| 10,277,052 B2 * | 4/2019 | Li | H02J 7/0065 | |
| 2002/0101218 A1 * | 8/2002 | Koenck | G01R 31/3655 | 320/140 |
| 2002/0195996 A1 * | 12/2002 | Nakatsuji | G01R 31/3624 | 320/127 |
| 2005/0099156 A1 * | 5/2005 | Brenner | H02J 7/0036 | 320/116 |
| 2006/0082220 A1 * | 4/2006 | Karam | H02J 13/0048 | 307/4 |
| 2006/0284595 A1 | 12/2006 | Hsieh et al. | | |
| 2007/0194626 A1 * | 8/2007 | Eager | H02J 7/0068 | 307/66 |
| 2007/0194750 A1 * | 8/2007 | Eager | H02J 7/0068 | 320/110 |
| 2008/0136372 A1 * | 6/2008 | Eto | H01M 10/443 | 320/114 |
| 2008/0303479 A1 * | 12/2008 | Park | H02J 7/025 | 320/108 |
| 2009/0200988 A1 * | 8/2009 | Bridges | G06Q 50/06 | 320/137 |
| 2009/0309547 A1 * | 12/2009 | Nakatsuji | H01M 10/441 | 320/134 |
| 2010/0013442 A1 * | 1/2010 | Yamazaki | H01M 10/44 | 320/162 |
| 2010/0070659 A1 * | 3/2010 | Ma | G06F 13/385 | 710/14 |
| 2010/0104031 A1 * | 4/2010 | Lacour | H04B 5/00 | 375/258 |
| 2010/0131691 A1 * | 5/2010 | Chatterjee | G06F 1/1632 | 710/303 |
| 2010/0146308 A1 * | 6/2010 | Gioscia | G06F 1/1632 | 713/300 |
| 2010/0188054 A1 * | 7/2010 | Asakura | G01R 31/025 | 320/161 |
| 2010/0201308 A1 * | 8/2010 | Lindholm | G06F 1/26 | 320/107 |
| 2010/0264877 A1 * | 10/2010 | Ashida | H01M 10/443 | 320/116 |

(56) References Cited

U.S. PATENT DOCUMENTS

| | | | | |
|---|---|---|---|---|
| 2010/0268492 A1* | 10/2010 | Matsuura | G01R 31/362 | 702/63 |
| 2010/0301809 A1* | 12/2010 | Bhade | B60L 11/1824 | 320/148 |
| 2011/0016341 A1* | 1/2011 | Tom | G06F 1/266 | 713/340 |
| 2011/0095723 A1* | 4/2011 | Bhade | B60L 11/1824 | 320/109 |
| 2011/0248670 A1* | 10/2011 | Yamazaki | H01M 2/0212 | 320/107 |
| 2011/0267001 A1* | 11/2011 | Hiraoka | H01M 10/0525 | 320/107 |
| 2012/0007546 A1* | 1/2012 | Eager | H02J 7/0068 | 320/103 |
| 2012/0141847 A1* | 6/2012 | Amagai | H01M 2/202 | 429/91 |
| 2012/0210146 A1* | 8/2012 | Lai | G06F 1/266 | 713/310 |
| 2012/0253715 A1* | 10/2012 | Ohtomo | B60L 11/1816 | 702/63 |
| 2013/0076301 A1* | 3/2013 | Bastami | H02J 7/0008 | 320/107 |
| 2013/0127414 A1* | 5/2013 | Ohtomo | B60L 3/0069 | 320/109 |
| 2013/0241469 A1* | 9/2013 | Ono | H02J 7/0042 | 320/107 |
| 2013/0249283 A1* | 9/2013 | Yokoyama | H01M 10/44 | 307/10.1 |
| 2013/0249479 A1* | 9/2013 | Partovi | H02J 7/025 | 320/108 |
| 2013/0271069 A1* | 10/2013 | Partovi | H02J 7/025 | 320/108 |
| 2013/0285604 A1* | 10/2013 | Partovi | H02J 7/0042 | 320/108 |
| 2013/0285605 A1* | 10/2013 | Partovi | H02J 7/0042 | 320/108 |
| 2014/0136863 A1* | 5/2014 | Fritchman | G06F 1/26 | 713/310 |
| 2014/0239985 A1* | 8/2014 | Sims | H02J 7/042 | 324/713 |
| 2014/0285133 A1* | 9/2014 | Toledo | H02J 7/007 | 320/101 |
| 2014/0285845 A1* | 9/2014 | Ishikawa | H04N 1/00204 | 358/1.15 |
| 2014/0300321 A1* | 10/2014 | Kim | H02J 7/0004 | 320/111 |
| 2014/0320075 A1* | 10/2014 | Baurle | G06F 13/4282 | 320/108 |
| 2014/0335919 A1* | 11/2014 | Stewart | H02J 7/0042 | 455/573 |
| 2015/0061578 A1* | 3/2015 | Keeling | H02J 50/80 | 320/108 |
| 2015/0074438 A1* | 3/2015 | Lai | G06F 1/266 | 713/323 |
| 2015/0077056 A1* | 3/2015 | Bridges | G06Q 50/06 | 320/109 |
| 2015/0180244 A1* | 6/2015 | Jung | H02J 7/0055 | 320/107 |
| 2015/0256018 A1* | 9/2015 | Wei | H02J 3/14 | 455/573 |
| 2015/0311729 A1* | 10/2015 | Ono | H02J 7/0042 | 320/106 |
| 2015/0339181 A1* | 11/2015 | Dolfi | H04L 43/00 | 714/5.1 |
| 2016/0036256 A1* | 2/2016 | Sukup | H02J 7/0052 | 320/107 |
| 2016/0052413 A1* | 2/2016 | Shimizu | B60L 11/184 | 700/291 |
| 2016/0064962 A1* | 3/2016 | Huang | H02J 7/0055 | 320/114 |
| 2016/0064963 A1* | 3/2016 | Huang | H02J 7/0055 | 320/114 |
| 2016/0064979 A1* | 3/2016 | Huang | H02J 7/0055 | 320/114 |
| 2016/0068073 A1* | 3/2016 | Taylor | B60L 11/1818 | 320/109 |
| 2016/0126756 A1* | 5/2016 | Okubo | H02J 7/0045 | 320/107 |
| 2016/0288658 A1* | 10/2016 | Rudolph | B60L 11/185 | |
| 2016/0344210 A1* | 11/2016 | Zhang | H02J 7/02 | |
| 2016/0344211 A1* | 11/2016 | Zhang | H02J 7/02 | |
| 2016/0344227 A1* | 11/2016 | Zhang | H02J 7/0031 | |
| 2016/0372963 A1* | 12/2016 | Sankar | H02J 50/05 | |
| 2016/0380462 A1* | 12/2016 | Zhang | H02J 7/04 | 320/107 |
| 2017/0012451 A1* | 1/2017 | Zhang | H02J 7/02 | |
| 2017/0040804 A1* | 2/2017 | Hu | H02J 7/022 | |
| 2017/0040814 A1* | 2/2017 | Hu | H02J 7/045 | |
| 2017/0040821 A1* | 2/2017 | Li | H02J 7/0052 | |
| 2017/0113563 A1* | 4/2017 | Lee | B60L 11/1844 | |
| 2017/0207648 A1* | 7/2017 | Xiao | H02J 7/0052 | |
| 2017/0250557 A1* | 8/2017 | Zhang | H02J 7/04 | |
| 2017/0346313 A1* | 11/2017 | Yao | H02J 7/0029 | |
| 2017/0358945 A1* | 12/2017 | Zhang | H02J 7/0031 | |
| 2018/0019585 A1* | 1/2018 | Koga | H02H 3/087 | |
| 2018/0131207 A1* | 5/2018 | Zhang | H02J 7/04 | |
| 2018/0175659 A1* | 6/2018 | Zhang | H02J 7/0031 | |
| 2018/0212435 A1* | 7/2018 | Li | H02J 7/0004 | |
| 2018/0278070 A1* | 9/2018 | Zhang | H02J 7/0044 | |
| 2019/0036361 A1* | 1/2019 | Zhang | H02J 7/02 | |

FOREIGN PATENT DOCUMENTS

| | | | |
|---|---|---|---|
| CN | 103066340 A | 4/2013 | |
| CN | 103762702 A | 4/2014 | |
| CN | 104065147 A | 9/2014 | |
| CN | 104079743 A | 10/2014 | |
| CN | 104092274 A | 10/2014 | |
| CN | 104124483 A | 10/2014 | |
| JP | H11150883 A | 6/1999 | |
| JP | 2005245078 A | 9/2005 | |
| JP | 2005287278 A | 10/2005 | |
| JP | 2006203980 A | 8/2006 | |
| JP | 2007288889 A | 11/2007 | |
| JP | 2007327772 A | 12/2007 | |
| JP | 2008035674 A | 12/2008 | |
| JP | 2009112111 A | 5/2009 | |
| JP | 2010263735 A | 11/2010 | |
| JP | 2013108793 A | 6/2013 | |
| JP | 2013198262 A | 9/2013 | |
| JP | 2014187575 A | 10/2014 | |
| KR | 20140120699 A | 10/2014 | |
| KR | 20150073677 A * | 7/2015 | H02J 7/0055 |
| WO | WO 2013178191 A2 | 12/2013 | |
| WO | WO 2014097640 A1 | 6/2014 | |

OTHER PUBLICATIONS

Japanese Patent Application No. 2016-573967 Notification of Reasons for Refusal dated Sep. 5, 2017 with English translation, 7 pages.
PCT/CN2014/090845 English Translation of the International Search Report & Written Opinion dated Aug. 14, 2015, 7 pages.
European Patent Application No. 14905952.9 extended European Search and Opinion dated Sep. 11, 2017, pages.
Australian Patent Application No. 2014411185 examination report dated Jul. 28, 2017, 3 pages.
Singapore Patent Application No. 11201609280R Invitation to Respond to Written Opinion, and Search Report dated Aug. 10, 2017, 10 pages.
Korean Patent Application No. 20167035467 Office Action dated Jan. 29, 2018, 6 pages.
Korean Patent Application No. 20167035467 English translation of Office Action dated Jan. 29, 2018, 6 pages.
Japanese Patent Application No. 2018026554 Office Action dated Dec. 4, 2018, 6 pages.
Japanese Patent Application No. 2018026554 English translation of Office Action dated Dec. 4, 2018, 4 pages.

(56) References Cited

OTHER PUBLICATIONS

Korean Patent Application No. 20187025357 Office Action dated Nov. 6, 2018, 5 pages.
Korean Patent Application No. 20187025357 English translation of Office Action dated Nov. 6, 2018, 4 pages.
European Patent Application No. 18206783.5 extended Search and Opinion dated Mar. 25, 2019, 7 pages.

* cited by examiner

POWER ADAPTOR, TERMINAL AND CHARGING SYSTEM

CROSS-REFERENCE TO RELATED APPLICATIONS

This application is a U.S. national phase application based on International Application No. PCT/CN2014/090845, filed on Nov. 11, 2014, the entire contents of which are incorporated herein by reference.

TECHNICAL FIELD

The present disclosure relates to field of charging, and more particularly, to a power adaptor, a terminal and a charging system.

BACKGROUND

At present, a smart phone is increasingly favored by consumers. However, generally it is required to charge the smart phone frequently because the smart phone has big power consumption. In addition, with an increasing battery capacity of the smart phone, a charging period of time can become longer correspondingly. How to realize quick-charging needs to be solved.

It can realize the quick-charging by increasing an output current via a power adaptor. However, when performing the quick-charging on a battery by a manner of increasing the output current, phenomenon, such as too high temperature, an overvoltage, an overcurrent, an interface burning and the like, can occur in the power adaptor or in the smart phone, thereby causing damage of the power adaptor or of the smart phone.

SUMMARY

Embodiments of the present disclosure provide a power adaptor, a terminal and a charging system.

In at least one embodiment, a power adaptor is provided. The power adaptor includes a power conversion unit and a charging interface. The charging interface includes a power line. The power conversion unit is configured to charge a terminal via the power line. The power adaptor further includes a communication unit. The charging interface further includes a data line. The communication unit is configured to communicate with the terminal via the data line when the power adaptor is coupled to the terminal.

In at least one embodiment, a terminal is provided. The terminal includes a battery and a charging interface. The charging interface includes a power line. The terminal is configured to introduce a charging current from a power adapter via the power line so as to charge the battery. The terminal further includes a communication unit. The charging interface further includes a data line. The communication unit is configured to communicate with the power adaptor via the data line when the terminal is coupled to the power adaptor.

In at least one embodiment, a charging system is provided. The charging system includes a power adaptor according to the first aspect or any of implementations thereof and a terminal according to the second aspect or any of the implementations thereof.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

DETAILED DESCRIPTION

The technical solutions in embodiments of the present disclosure will be described clearly and completely hereinafter with reference to accompanying drawings in embodiments of the present disclosure. Apparently, embodiments described are a part of embodiments of the present disclosure, but not all embodiments. All other embodiments obtained by those skilled in the art based on the embodiments in the present disclosure without creative labor shall fall in the protection scope of the present disclosure.

Figure 1:
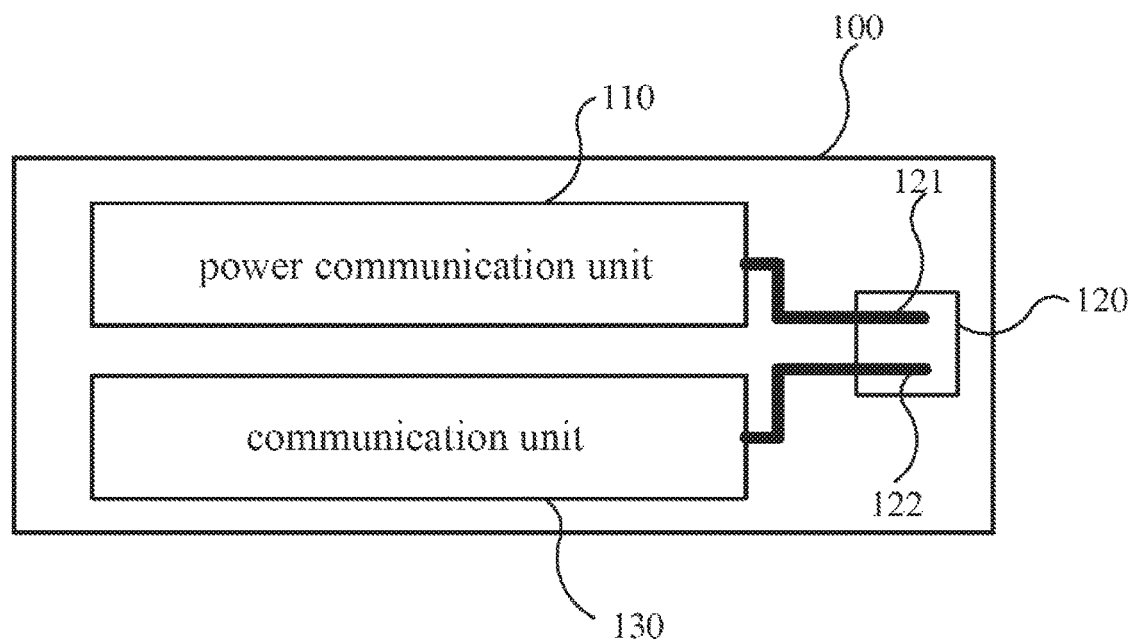
FIG. 1 is a block diagram of a power adaptor according to embodiments of the present disclosure.

FIG. 1 is a block diagram of a power adaptor according to embodiments of the present disclosure. The power adaptor 100 includes a power conversion unit 110 and a charging interface 120. The charging interface 120 includes a power line 121. The power conversion unit 110 is configured to charge a terminal via the power line 121. The power adaptor 100 further includes a communication unit 130. The charging interface 120 further includes a data line 122. The communication unit 130 is configured to communicate with the terminal via the data line 122 when the power adaptor 100 is coupled to the terminal.

In at least one embodiment, the power conversion unit 110 is configured to convert alternating current to direct current. For example, the power conversion unit 110 can convert 220V utility power to 5V direct-current power.

The number of the power line 121 can be one or more than one. The number of the data line 122 can be one or more than one.

The charging interface 120 can be a USB interface. The data line 122 can be at least one of a D+ line and a D− line of the USB interface. Furthermore, the power adaptor 100 in embodiments of the present disclosure can be integrated with a USB cable, or can include a USB connector and coupled to the terminal via a USB cable. In at least one embodiment, the USB interface can be a normal USB interface or also can be a micro USB interface.

In at least one embodiment, the power adaptor 100 can perform one or more handshakes with the terminal when it is coupled to the terminal. After the handshake, the power adaptor 100 starts to charge the terminal. The so-called "handshake" herein refers to that the power adaptor 100 and the terminal send messages (or signals) to each other so as to perform interactions on various required information before charging. The various required information can be, such as, a version or a type of the power adaptor 100, a version or a type of the terminal, a working state of the power adaptor 100, a value of battery temperature of the terminal, a charging mode supported by the power adaptor 100 and by the terminal, a capability of the power adaptor 100 for outputting a voltage and a current, a capability of the terminal for receiving a voltage and a current and the like. The power adaptor 100 negotiates with the terminal on a charging mode and a charging parameter by performing interactions on that information. For example, the charging mode includes a quick-charging mode and a common charging mode; and the charging parameter includes a charging voltage (such as an initial charging voltage), and a charging current (such as an initial charging current).

As known from the above, communication between the communication unit 130 and the terminal can occur during a process of negotiation before the power adaptor 100 charges the terminal (the power adaptor 100 does not output the charging current to the terminal yet at this moment). However, in embodiments of the present disclosure, it is not limited thereto. The communication between the communication unit 130 and the terminal can occur during a process of charging the terminal by the power adaptor 100 (that is, during a process of outputting the charging current to the terminal by the power adaptor 100). For example, a value of a battery voltage is received from the terminal during charging; or from the terminal, an input voltage value or an input current value of the power adaptor 100 detected by the terminal is received during charging; or an interaction with the terminal on information, such as an overcurrent/overvoltage, is performed during charging. Furthermore, the communication between the communication unit 130 and the terminal can occur at the end of the charging. For example, the power adaptor 100 negotiates with the terminal to finish charging.

In embodiments of the present disclosure, the power adaptor 100 charges the terminal still using the power line 121. Furthermore, the power adaptor 100 can communicate with the terminal via the data line 122 when the power adaptor 100 is coupled to the terminal. Compared with the method of data and power time-division multiplexing the power line 121, it is effectively avoided the heating phenomenon of the power line 121 caused by an excessively high load of a signal isolation unit.

In at least one embodiment, as an embodiment, the communication unit 130 is configured to perform two-way communication with the terminal via the data line 122.

In detail, the communication unit 130 and the terminal can perform interactions on parameters thereof with each other. For example, the communication unit 130 sends an output current value or voltage value of the power adaptor 100 to the terminal during charging, and the terminal also sends an input current value and voltage value received from the power adaptor 100 by the terminal to the communication unit 130. For another example, the communication unit 130 sends a handshake request message to the terminal to ask whether the terminal supports the quick-charging mode, and the terminal sends a handshake response message to the communication unit 130 to notify the power adaptor 100 of the charging mode supported by the terminal.

In at least one embodiment, as an embodiment, the communication unit 130 is configured to negotiate with the terminal on the charging mode of the terminal before the terminal is charged. The charging mode includes a quick-charging mode and a common charging mode.

In detail, the communication unit 130 and the terminal send handshake signals to each other, so as to negotiate on the charging mode of the terminal. The handshake signal can be sent by the communication unit 130 to the terminal, or also can be sent by the terminal to the communication unit 130.

In at least one embodiment, as an implementation, the communication unit 130 is configured to negotiate with the terminal on the charging mode by acts of: sending, by the communication unit 130, a handshake request message to the terminal; receiving, by the communication unit 130, a handshake response message from the terminal, in which the handshake response message indicates that the terminal supports the quick-charging mode; and determining, by the communication unit 130, to charge the terminal with accordance to the quick-charging mode according to the handshake response message.

It is to be understood that, the handshake request message can indicate that the power adaptor 100 is a power adaptor supporting the quick-charging mode. That is, it is known that the power adaptor 100 supports the quick-charging mode correspondingly when the terminal receives the handshake request message sent by the power adaptor 100. Or, the handshake request message does not carry with any information and is merely a request for communicating with the terminal. The power adaptor 100 further negotiates with the terminal on the charging mode, the charging parameter and such information after the terminal responds with the handshake request message.

In at least one embodiment, as another implementation, the communication unit 130 is configured to negotiate with the terminal on the charging mode by acts of: sending, by the communication unit 130, a handshake request message to the terminal; and determining, by the communication unit 130, to charge the terminal with accordance to the common charging mode when a handshake response message sent by the terminal does not received.

For example, the power adaptor 100 sends the handshake request message to the terminal and the terminal responds with the handshake response message when both of the power adaptor 100 and the terminal support the quick-charging mode. However, the power adaptor 100 charges the terminal as default with accordance to the common charging mode when the terminal does not respond with the handshake response message. In at least one embodiment, there are a plurality of reasons that the terminal does not respond with the handshake response message back. For example, the terminal does not support the quick-charging mode so as not to recognize the handshake request message; or it is not satisfied a quick-charging condition according to a working condition thereof although the terminal recognizes the handshake request message, so as to abandon sending the handshake response message to the power adaptor 100. For example, the terminal finds that the electric quantity of the battery is too low to enter the quick-charging mode immediately. Then, the terminal will not respond with the handshake response message, and the power adaptor 100 charges the terminal with accordance to the common charging mode.

In at least one embodiment, as another implementation, the communication unit 130 is configured to negotiate with the terminal on the charging mode by acts of: sending, by the communication unit 130, a handshake request message to the terminal; receiving, by the communication unit 130, a handshake response message from the terminal, in which the handshake response message includes a charging mode supported by the terminal and a current working parameter of the terminal; determining, by the communication unit 130, to charging the terminal with accordance to the quick-charging mode when both of the power adaptor 100 and the terminal support the quick-charging mode and the current working parameter of the terminal satisfies a quick-charging condition; and determining, by the communication unit 130, to charge the terminal with accordance to the common charging mode when both of the power adaptor 100 and the terminal support the quick-charging mode and the current working parameter of the terminal does not satisfy a quick-charging condition.

In detail, the power adaptor 100 judges whether the terminal supports the quick-charging condition firstly after receiving the handshake response message. It further judges whether the current working parameter of the terminal satisfies the quick-charging condition when the terminal supports the quick-charging mode. For example, whether the value of the battery temperature of the terminal satisfies temperature value required by the quick-charging mode; whether the value of the battery voltage of the terminal satisfies a minimum value of the voltage required by the quick-charging mode, and the like. It is charged with accordance to the quick-charging mode when the current working parameter of the terminal satisfies the quick-charging condition, otherwise, it is charged with accordance to the common charging mode.

In at least one embodiment, the quick-charging mode and the common charging mode are two relative concepts. In at least one embodiment, the period of time spent by the quick-charging mode is less than that spent by the common charging mode when it is needed to charge the battery from a first electricity to a second electricity (the second electricity is greater than the first electricity). There are a plurality of implementation forms of the quick-charging mode. For example, compared with the common charging mode, it provides a bigger voltage or current to the terminal.

In at least one embodiment, the negotiation between the power adaptor 100 and the terminal before charging is not limited to the negotiation on the charging mode. The negotiation can be on the charging voltage, the charging current and such parameters.

In at least one embodiment, as an embodiment, the communication unit 130 is configured to negotiate with the terminal on the charging parameter before the terminal is charged. The charging parameter includes at least one of followings: the charging voltage and the charging current.

Taking an example to illustrate, the communication unit 130 sends a handshake request message to the terminal. And then the communication unit 130 receives a handshake response message of the terminal, in which the handshake response message includes at least one of following information: a version of the terminal, an identifier of the terminal, a value of battery temperature of the terminal, and a maximum value of the charging voltage supported by the terminal and a maximum value of the charging current supported by the terminal. Further, the communication unit 130 determines the charging parameter according to information in the handshake response message.

For example, the communication unit 130 acquires that the terminal supports the quick-charging mode from the handshake response message. And then the communication unit 130 determines a voltage/current value of the terminal with the version during quick-charging according to the version of the terminal. Or, the communication unit 130 determines an initial voltage/current value of the quick-charging mode according to a value of a current electric quantity of the battery.

In at least one embodiment, as an embodiment, the communication unit 130 is configured to keep communication with the terminal during a procedure of outputting the charging current to the terminal by the power adaptor 100.

In at least one embodiment, one-way communication between the communication unit 130 and the terminal may be performed during the procedure of outputting the charging current to the terminal by the power adaptor 100. For example, a value of the battery voltage is acquired from the terminal, and an output voltage and current are adjusted according thereto. Two-way communication between the communication unit 130 and the terminal also may be performed. For example, the power adaptor 100 sends an output voltage value and current value to the terminal, and from the terminal, receives a voltage value and current value input by the power adaptor 100 and detected by the terminal.

Figure 4:
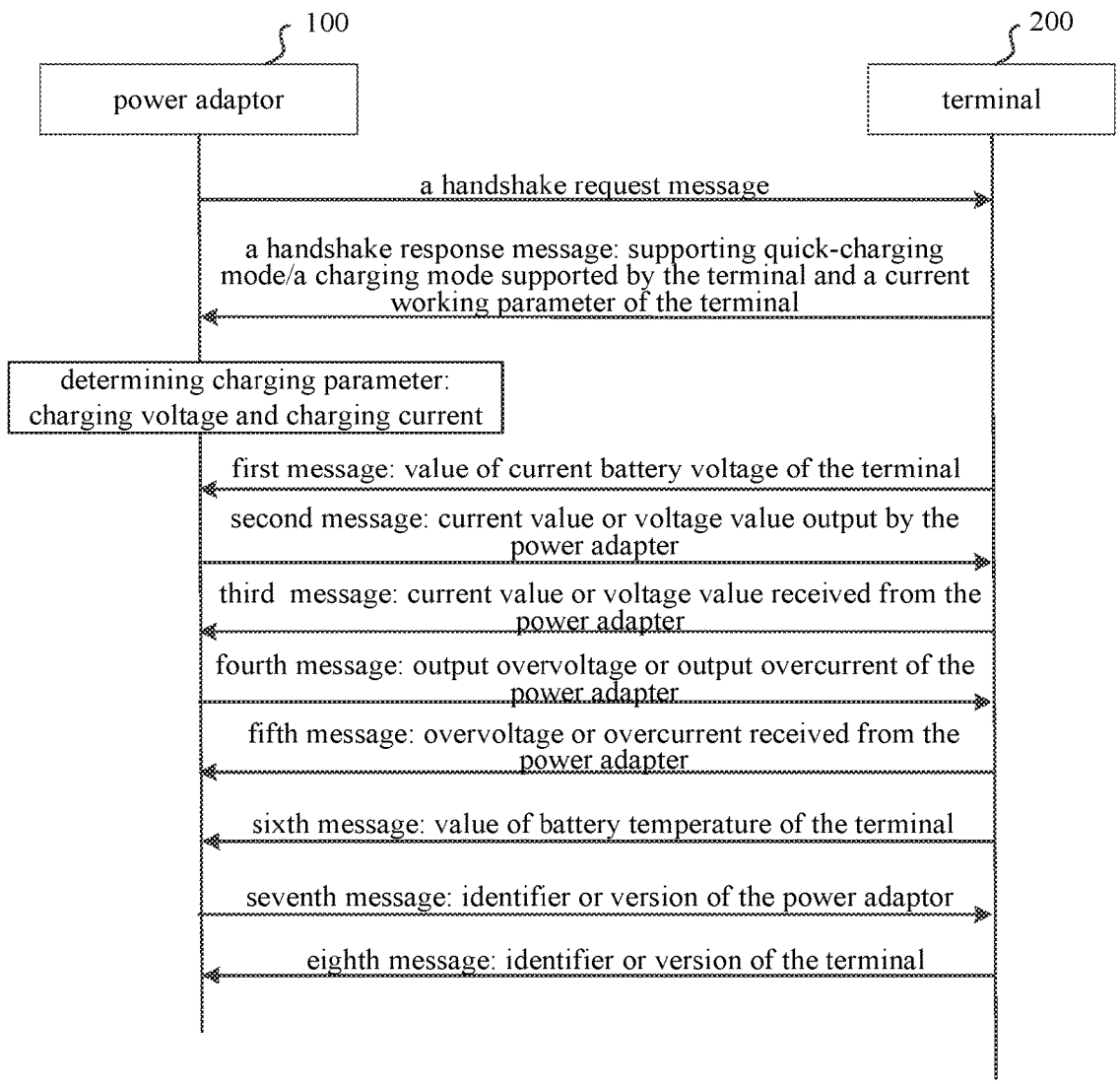
FIG. 4 is a schematic diagram illustrating a communication between a power adaptor and a terminal according to embodiments of the present disclosure.

FIG. 4 is a schematic diagram illustrating a communication between a power adapter and a terminal according to embodiments of the present disclosure.

In at least one embodiment, as illustrated in FIG. 4, the communication unit 130 is configured to receive a first message from the terminal via the date line 122 during the procedure of outputting the charging current to the terminal by the power adaptor 100. The first message indicates a value of a current battery voltage of the terminal.

The power adaptor 100 can adjust the output voltage by acquiring the value of the current battery voltage of the terminal from the terminal. It can be avoided that the voltage applied on the battery of the terminal exceeds a safe charging voltage of the battery. As a result, it can improve safety while charging using the power adaptor 100 of embodiments of the present disclosure.

In at least one embodiment, as illustrated in FIG. 4, the communication unit 130 is configured to send a second message to the terminal via the data line 122 during the procedure of outputting the charging current to the terminal by the power adaptor 100. The second message indicates a voltage value or a current value output by the power adaptor 100.

The terminal can determine whether the input voltage or current matches to the voltage or current output by the power adaptor 100 by sending a message indicating the voltage value and current value output by the power adaptor 100 to the terminal. It can be further determined whether there is a fault in coupling between the power adaptor 100 and the terminal (such as a short circuit). As a result, it can further improve safety while charging using the power adaptor 100 of embodiments of the present disclosure.

In at least one embodiment, as illustrated in FIG. 4, the communication unit 130 is configured to receive a third message from the terminal via the data line 122 during the procedure of outputting the charging current to the terminal by the power adaptor 100. The third message can indicate a current value or a voltage value received by the power adaptor 100.

The power adaptor 100 can determine whether the output voltage or current matches to the voltage and current input into the terminal by receiving a message indicating the voltage value or current value input into the terminal sent by the terminal. It can be further determined whether there is a fault in coupling between the power adaptor 100 and the terminal (such as a short circuit). As a result, it can further improve safety while charging using the power adaptor 100 of embodiments of the present disclosure.

In at least one embodiment, as the coupling between the power adaptor 100 and the terminal is generally realized via the charging interface 120, the circuit on the charging interface 120 can have impedance. Therefore, a voltage/current value output to the terminal by the power adaptor 100 cannot always be equal to a voltage/current value received from the power adaptor 100 by the terminal. The voltage/current value output by the power adaptor 100 is different greatly from the voltage/current received by the terminal when the impedance of the circuit on the charging interface 120 is very high. Therefore, an interaction on the voltage/current value can provide support for finding and excluding a fault subsequently.

In at least one embodiment, as illustrated in FIG. 4, the communication unit 130 is configured to send a fourth message to the terminal via the data line 122 during charging the terminal. The fourth message indicates an output overvoltage or an output overcurrent of the power adaptor 100.

In at least one embodiment, as illustrated in FIG. 4, the communication unit 130 is configured to receive a fifth message from the terminal via the data line 122 during charging the terminal. The fifth message indicates an overvoltage or an overcurrent received from the power adaptor 100 by the terminal.

In at least one embodiment, as an embodiment, the communication unit 130 is configured to receive a sixth message from the terminal via the data line 122 before charging the terminal. The sixth message indicates a value of battery temperature of the terminal.

The power adaptor 100 can determine a state of the battery by acquiring the value of the current battery temperature of the terminal from the terminal. For example, the terminal determines the safety of the battery low so as to stop power outputting when the value of the battery temperature is higher than a preset threshold. As a result, it can improve safety while charging using the power adaptor 100 of embodiments of the present disclosure.

In at least one embodiment, as an embodiment, the communication unit 130 is configured to send a seventh message to the terminal via the data line 122 before charging the terminal. The seventh message indicates an identifier or a version of the power adaptor 100.

The terminal can determine the coupled device is the power adaptor 100 by sending a message indicating the identifier or the version of the power adaptor 100 to the terminal. Thus, the phone can be triggered into a processing of a charging state (the processing can be similar to the prior art, herein, in order to avoid repeating again, detailed introduction can be omitted). It can be avoided a fault caused by the phone mistaken assuming the coupled device to be a computer or other terminals.

In at least one embodiment, as illustrated in FIG. 4, the communication unit 130 is configured to receive an eighth message from the terminal via the data line 122 before charging the terminal. The eighth message indicates an identifier or a version of the terminal.

The power adaptor 100 can determine a battery parameter used by terminal (such as whether it is supported the quick-charging, a rated charging voltage or the like) according to a pre-stored data by receiving data of the identifier or the version of the terminal from the terminal. Further, the terminal can output a power corresponding to the parameter of the battery to the terminal. As a result, it can improve safety while charging using the power adaptor 100 of embodiments of the present disclosure.

The description combined with the FIG. 1, describes the power adaptor according to embodiments of the present disclosure in detail. The below description combined with FIG. 2, will describe the terminal according to embodiments of the present disclosure in detail. In at least one embodiment, the power adaptor and the terminal are interoperable and relative with each other in a charging system. In order to clarity, repeated description can be appropriately omitted.

Figure 2:
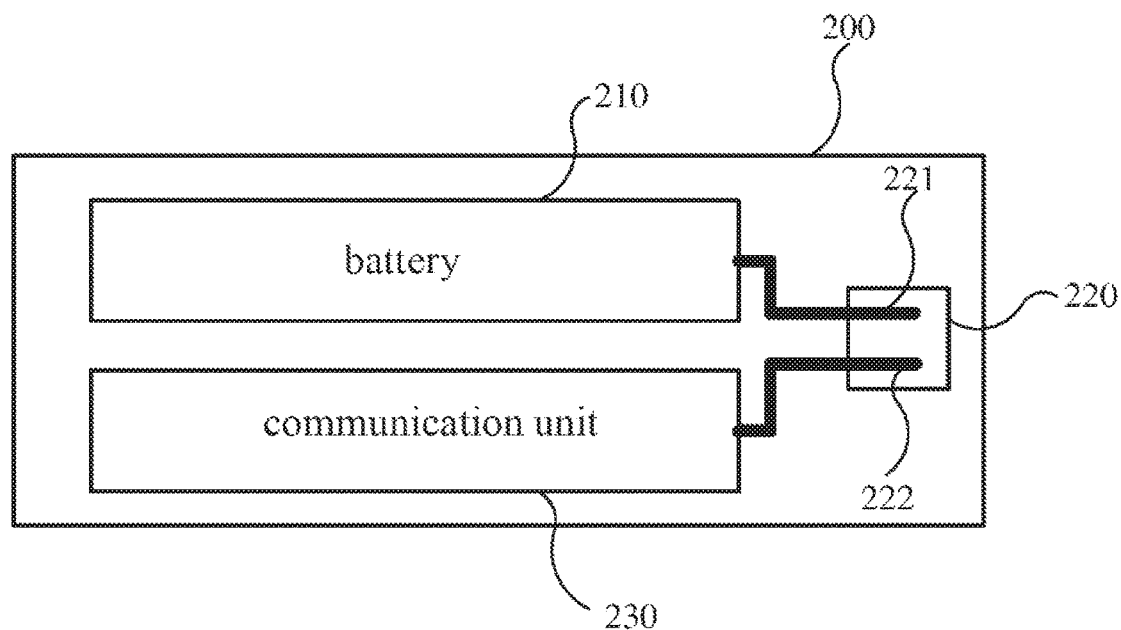
FIG. 2 is a block diagram of a terminal according to embodiments of the present disclosure.

FIG. 2 is a block diagram of a terminal according to embodiments of the present disclosure. The terminal 200 illustrated in FIG. 2 includes a battery 210 and a charging interface 220. The charging interface 220 includes a power line 221. The terminal 200 is configured to introduce a charging current from the power adaptor via the power line 221, so as to charge the battery 210. The terminal 200 further includes a communication unit 230. The charging interface 220 further includes a data line 222. The communication unit 230 is configured to communicate with the power adaptor via the data line 222 when the terminal 200 is coupled to the power adaptor.

In embodiments of the present disclosure, the power adaptor charges the terminal 200 still using the power line 221. Furthermore, the power adaptor can communicate with the terminal 200 via the data line 222 when the power adaptor is coupled to the terminal 200. Compared with the method of data and power time-division multiplexing the power line 221, it is effectively avoided the heating phenomenon of the power line 221 caused by an excessively high load of a signal isolation unit.

In at least one embodiment, as an embodiment, the communication unit 230 is configured to negotiate with the power adaptor on a charging mode of the terminal 200 before the terminal 200 is charged. The charging mode can include a quick-charging mode and a common charging mode.

In at least one embodiment, as an embodiment, the communication unit 230 is configured to negotiate with the power adaptor on the charging mode of the terminal 200 by acts of: receiving, by the communication unit 230, a handshake request message from the power adaptor, in which the handshake request message can indicate that the power adaptor supports the quick-charging mode; and sending, by the communication unit 230, a handshake response message to the power adaptor, in which the handshake response message can indicate the power adaptor to charge the terminal 200 with accordance to the quick-charging mode.

In at least one embodiment, as an embodiment, the communication unit 230 is configured to negotiate with the power adaptor on the charging mode of the terminal 200 by acts of: receiving, by the communication unit 230, a handshake request message from the power adaptor, in which the handshake request message can indicate that the power adaptor supports the quick-charging mode; sending, by the communication unit 230, a handshake response message to the power adaptor when a current working parameter of the terminal 200 satisfies a quick-charging condition, in which the handshake response message can indicate the power adaptor to charge the terminal 200 with accordance to the quick-charging mode; and sending, by the communication unit 230, a handshake response message to the power adaptor when a current working parameter of the terminal 200 does not satisfy a quick-charging condition, in which the handshake response message can indicate the power adaptor to charge the terminal 200 with accordance to the common charging mode.

In at least one embodiment, as an embodiment, the communication unit 230 is configured to negotiate with the power adaptor on a charging parameter before charging the terminal 200. The charging parameter can include at least one of following parameters: a charging voltage and a charging current.

In at least one embodiment, as an embodiment, the communication unit 230 is configured to negotiate with the power adaptor on the charging parameter by acts of: receiving, by the communication nit 230, a handshake request message form the power adaptor, in which the handshake request message can include at least one of following information: a version of the power adaptor, an identifier of the power adaptor, a working state of the power adaptor, and a maximum value of an output voltage supported by the power adaptor and a maximum value of an output current supported by the power adaptor; determining, by the communication nit 230, the charging parameter according to information in the handshake request message; and sending, by the communication unit 230, a handshake response message to the power adaptor, in which the handshake response message can indicate the power adaptor to charge the terminal 200 with accordance to the charging parameter.

In at least one embodiment, as an embodiment, the charging interface 220 can be a USB interface.

In at least one embodiment, as an embodiment, the data line 222 can be at least one of a D+ line and a D− line of the USB interface.

In at least one embodiment, as an embodiment, the communication unit 230 is configured to keep communication with the power adaptor via the data line 222 during a procedure of receiving a charging current from the power adaptor by the terminal 200.

In at least one embodiment, as illustrated in FIG. 4, the communication unit 230 is configured to send a first message to the power adaptor via the data line 222 during the procedure of receiving the charging current from the power adaptor by the terminal 200. The first message can indicate a value of a current battery voltage of the terminal 200.

In at least one embodiment, as illustrated in FIG. 4, the communication unit 230 is configured to receive a second message from the power adaptor via the data line 222 during procedure of receiving the charging current from the power adaptor by the terminal 200. The second message can indicate a current value or a voltage value output by the power adaptor.

In at least one embodiment, as illustrated in FIG. 4, the communication unit 230 is configured to send a third message to the power adaptor via the data line 222 during the procedure of receiving the charging current from the power adaptor by the terminal 200. The third message can indicate a current value or a voltage value received from the power adaptor by the terminal 200.

In at least one embodiment, as illustrated in FIG. 4, the communication unit 230 is configured to receive a fourth message from the power adaptor via the data line 222 during the procedure of receiving the charging current from the power adaptor by the terminal 200. The fourth message can indicate an overvoltage or an overcurrent output by the power adaptor.

In at least one embodiment, as illustrated in FIG. 4, the communication unit 230 is configured to send a fifth message to the power adaptor via the data line 222 during the procedure of receiving the charging current from the power adaptor by the terminal 200. The fifth message can indicate an overvoltage or an overcurrent received from the power adaptor.

In at least one embodiment, as an embodiment, the terminal 200 can be a smart phone.

In at least one embodiment, the mentioned smart phone is merely one example of the terminal 200. Embodiments of the present disclosure are not limited thereto. Technical solutions of the present disclosure can be applied in various devices of finishing functions with power supplied by the battery 210. For example, a tablet computer, a portable computing device, a message displaying device, an image shooting device, a messaging device or the like.

In at least one embodiment, as an embodiment, communication between the communication unit 230 and the power adaptor can be two-way communication.

Figure 3:
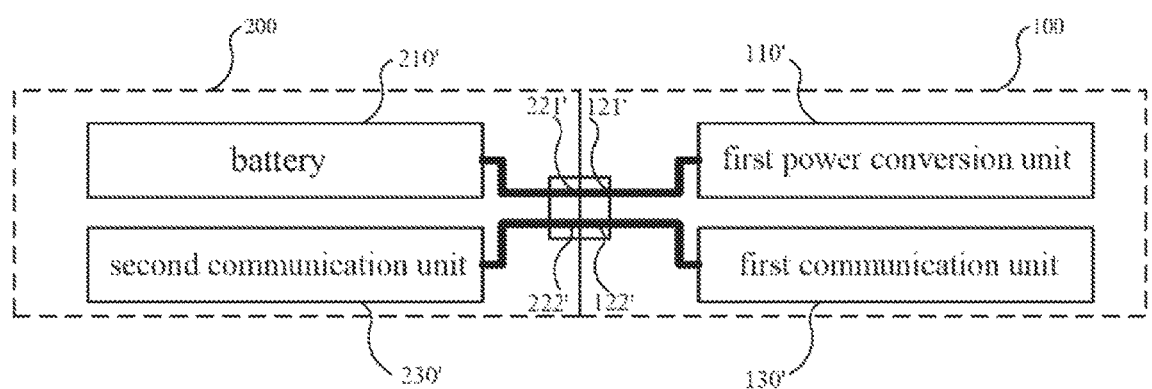
FIG. 3 is a block diagram of a charging system according to embodiments of the present disclosure.

FIG. 3 is a block diagram of a charging system according to embodiments of the present disclosure. The charging system includes a power adaptor 100 and a terminal 200.

The power adaptor 100 includes a first power conversion unit 110', a first charging interface including a first power line 121' and a first data line 122', and a first communication unit 130'. The terminal 200 includes a battery 210', a second charging interface including a second power line 221' and a second data line 222', and a second communication unit 230'.

The first power conversion unit 110' is configured to charge the terminal 200 via the first power line 121'. The first communication unit 130' is configured to communicate with the terminal 200 via the first data line 122' when the power adaptor 100 is coupled to the terminal 200.

The terminal 200 is configured to introduce a charging current from the power adaptor 100 via the second power line 221' to charge the battery 210'. The second communication unit 230' is configured to communicate with the power adaptor 200 via the second data line 222' when the terminal 200 is coupled to the power adapter 100.

The first power conversion unit 110' can refer to the power conversion unit 110 described above. The first power line 121' can refer to the power line 121 described above. The first data line 122' can refer to the data line 122 described above. The first communication unit 130' can refer to the communication unit 130 described above.

The second power line 221' can refer to the power line 221 described above. The second data line 222' can refer to the data line 222 described above. The second communication unit 230' can refer to the communication unit 230 described above.

It is to be understood that, term "and/or" mentioned is merely a purpose for describing an association between associated objects, which represents three relations. For example, A and/or B, can represent three conditions: A existing alone, A and B both existing at a same moment, and B existing alone. Furthermore, character "/" mentioned merely represents a "or" relation between an object in front thereof and another object thereafter.

It is to be understood that, in various embodiments of the present disclosure, sequence number of each process does not refer to a performance order. The performance order of each process is determined by functions and internal logic thereof, but does not limit the implementation process of embodiments of the present disclosure.

Those skilled in the art can be aware that, units and algorithm steps in respective examples described with reference to embodiments disclosed in the present disclosure can be realized by electronic hardware or combination of computer software and electronic hardware. Executing these functions in hardware or software depends on particular applications and design constraint conditions of the technical solutions. Technology professionals can use different methods to realize the described functions for each particular application, which should be regarded as being within the scope of the present disclosure.

Those skilled in the art can understand clearly that, for convenience and simplicity of description, specific working process of the above system, devices and units can refer to corresponding process in the above method embodiments, which will not be elaborated herein.

It should be understood that, the system, devices and method disclosed in several embodiments provided by the present disclosure can be realized in any other manner. For example, the device embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units can be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit.

If the functions are realized in form of functional software units and are sold or used as separate products, they can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium can be any medium capable of storing program codes, including a USB flash disk, a mobile hard disk, a Read-Only Memory (ROM), a Random Access Memory (RAM), a disc, or a light disk.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure. Thus, the protection scope of the present disclosure shall be limited by the protection scope of the claims.

What is claimed is:

1. A power adaptor, comprising a power conversion unit and a charging interface, the charging interface comprising a power line, the power conversion unit being configured to charge a terminal via the power line, wherein, the power adaptor further comprises a communication unit, the charging interface further comprises a data line, and the communication unit is configured to communicate with the terminal via the data line when the power adaptor is coupled to the terminal; during a procedure of outputting a charging current to the terminal by the power adaptor, the communication unit is configured to receive a first message from the terminal via the data line, the first message indicates a value of a current battery voltage of the terminal; during the procedure of outputting the charging current to the terminal by the power adaptor, the communication unit is configured to send a second message to the terminal via the data line, the second message indicates a current value or a voltage value output by the power adaptor; and the communication unit is further configured to receive a third message from the terminal via the data line, the third message indicates a current value or a voltage value received from the power adaptor by the terminal, to determine whether there is a fault in coupling between the power adaptor and the terminal; and the power adaptor is configured to adjust the charging current according to the value of the current battery voltage of the terminal during the procedure of outputting the charging current to the terminal by the power adaptor.

2. The power adaptor according to claim 1, wherein, the communication unit is configured to negotiate a charging parameter with the terminal before the terminal is charged, and the charging parameter comprises at least one of following parameters: a charging voltage and a charging current.

3. The power adaptor according to claim 2, wherein, the communication unit is configured to negotiate the charging parameter with the terminal by acts of:

sending, by the communication unit, a handshake request message to the terminal;

receiving, by the communication unit, a handshake response message from the terminal, wherein the handshake response message comprises at least one of following information: a version of the terminal, an identifier of the terminal, a value of battery temperature of the terminal, a maximum value of the charging voltage supported by the terminal and a maximum value of the charging current supported by the terminal; and determining, by the communication unit, the charging parameter according to information in the handshake response message.

4. The power adaptor according to claim 1, wherein, during the procedure of outputting the charging current to the terminal by the power adaptor, the communication unit is configured to send a fourth message to the terminal via the data line, the fourth message indicates an output overvoltage or an output overcurrent of the power adaptor.

5. The power adaptor according to claim 4, wherein, during the procedure of outputting the charging current to the terminal by the power adaptor, the communication unit is configured to receive a fifth message from the terminal via the data line, the fifth message indicates an overvoltage or an overcurrent received from the power adaptor by the terminal.

6. The power adaptor according to claim 1, wherein, the communication unit is configured to negotiate a charging mode of the terminal with the terminal before the terminal is charged, and the charging mode comprises a quick-charging mode and a common charging mode.

7. The power adaptor according to claim 6, wherein, the communication unit is configured to negotiate the charging mode of the terminal with the terminal by acts of:

sending, by the communication unit, a handshake request message to the terminal;

receiving, by the communication unit, a handshake response message from the terminal, wherein the handshake response message indicates that the terminal supports the quick-charging mode;

determining, by the communication unit, to charge the terminal with accordance to the quick-charging mode according to the handshake response message; and determining, by the communication unit, to charge the terminal with accordance to the common charging mode when a handshake response message sent by the terminal is not received.

8. The power adaptor according to claim 6, wherein, the communication unit is configured to negotiate the charging mode of the terminal with the terminal by acts of:

sending, by the communication unit, a handshake request message to the terminal;

receiving, by the communication unit, a handshake response message from the terminal, wherein the handshake response message comprises a charging mode supported by the terminal and a current working parameter of the terminal;

determining, by the communication unit, to charge the terminal with accordance to the quick-charging mode when both of the power adaptor and the terminal support the quick-charging mode and the current working parameter of the terminal satisfies a quick-charging condition; and determining, by the communication unit, to charge the terminal with accordance to the common charging mode when both of the power adaptor and the terminal support the quick-charging mode and the current working parameter of the terminal does not satisfy a quick-charging condition.

9. A terminal, comprising a battery and a charging interface, the charging interface comprising a power line, the terminal being configured to introduce a charging current from a power adaptor via the power line to charge the battery, wherein, the terminal further comprises a communication unit, the charging interface further comprises a data line, and the communication unit is configured to communicate with the power adaptor via the data line when the terminal is coupled to the power adapter; and during a procedure of receiving a charging current from the power adaptor by the terminal, the communication unit is configured to send a first message to the power adaptor via the data line, the first message indicates a value of a current battery voltage of the terminal; during the procedure of receiving the charging current from the power adaptor by the terminal, the communication unit is configured to receive a second message from the power adaptor via the data line, the second message indicates a current value or a voltage value output by the power adaptor; and the communication unit is further configured to send a third message to the power adaptor via the data line, the third message indicates a current value or a voltage value received from the power adaptor by the terminal, to determine whether there is a fault in coupling between the terminal and the power adaptor; such that the power adaptor is configured to adjust the charging current according to the value of the current battery voltage of the terminal during the procedure of outputting the charging current to the terminal by the power adaptor.

10. The terminal according to claim 9, wherein, during the procedure of receiving the charging current from the power adaptor by the terminal, the communication unit is configured to receive a fourth message from the power adaptor via the data line, the fourth message indicates an output overvoltage or an output overcurrent of the power adaptor; and the communication unit is further configured to send a fifth message to the power adaptor via the data line, the fifth message indicates an overvoltage and an overcurrent received from the power adaptor.

11. The terminal according to claim 9, wherein, the communication unit is configured to negotiate a charging parameter with the power adaptor before the terminal is charged, and the charging parameter comprises at least one of following parameters: a charging voltage and a charging current.

12. The terminal according to claim 11, wherein, the communication unit is configured to negotiate the charging parameter with the power adapter by acts of:

receiving, by the communication unit, a handshake request message from the power adaptor, wherein the handshake request message comprises at least one of following information: a version of the power adaptor, an identifier of the power adaptor, a working state of the power adaptor, a maximum value of an output voltage supported by the power adaptor and a maximum value of an output current supported by the power adaptor;

determining, by the communication unit, the charging parameter according to information in the handshake request message; and sending, by the communication unit, a handshake response message to the power adaptor, wherein the handshake response message indicates the power adaptor to charge the terminal with accordance to the charging parameter.

13. The terminal according to claim 9, wherein, the communication unit is configured to negotiate a charging mode of the terminal with the power adaptor before the terminal is charged, and the charging mode comprises a quick-charging mode and a common charging mode.

14. The terminal according to claim 13, wherein, the communication unit is configured to negotiate the charging mode of the terminal with the power adaptor by acts of:

receiving, by the communication unit, a handshake request message from the power adaptor, wherein the handshake request message indicates that the power adaptor supports the quick-charging mode; and sending, by the communication unit, a handshake response message to the power adaptor, wherein the handshake response message indicates the power adaptor to charge the terminal with accordance to the quick-charging mode.

15. The terminal according to claim 13, wherein, the communication unit is configured to negotiate the charging mode of the terminal with the power adapter by acts of:

receiving, by the communication unit, a handshake request message from the power adaptor, wherein the handshake request message indicates that the power adaptor supports the quick-charging mode;

sending, by the communication unit, a handshake response message to the power adaptor when a current working parameter of the terminal satisfies a quick-charging condition, wherein the handshake response message indicates the power adaptor to charge the terminal with accordance to the quick-charging mode; and sending, by the communication unit, a handshake response message to the power adaptor when a current working parameter of the terminal does not satisfy a quick-charging condition, wherein the handshake response message indicates the power adaptor to charge the terminal with accordance to the common charging mode.

16. A charging system, comprising a power adaptor and a terminal, wherein the power adaptor, comprises a first power conversion unit, a first charging interface comprising a first power line, the first power conversion unit being configured to charge the terminal via the first power line, and a first communication unit, the first charging interface further comprises a first data line, and the first communication unit is configured to communicate with the terminal via the first data line when the power adaptor is coupled to the terminal; the terminal comprises a battery, a second charging interface comprising a second power line, the terminal being configured to introduce a charging current from the power adaptor via the second power line to charge the battery, and a second communication unit, the second charging interface further comprises a second data line, and the second communication unit is configured to communicate with the power adaptor via the second data line when the terminal is coupled to the power adapter; and wherein: during a procedure of outputting a charging current to the terminal by the power adaptor, the first communication unit is configured to receive a first message from the terminal via the first data line, the first message indicates a value of a current battery voltage of the terminal; during the procedure of outputting the charging current to the terminal by the power adaptor, the first communication unit is configured to send a second message to the terminal via the data line, to receive a third message from the terminal via the data line, and to determine whether there is a fault in coupling between the power adaptor and the terminal; the second message indicates a current value or a voltage value output by the power adaptor, and the third message indicates a current value or a voltage value received from the power adaptor by the terminal; or during the procedure of outputting the charging current to the terminal by the power adaptor, the second communication unit is configured to receive a second message from the power adaptor via the data line, to send a third message to the power adaptor via the data line, and to determine whether there is a fault in coupling between the terminal and the power adaptor; the second message indicates a current value or a voltage value output by the power adaptor; and the third message indicates a current value or a voltage value received from the power adaptor by the terminal; and the power adaptor is configured to adjust the charging current according to the value of the current battery voltage of the terminal during the procedure of outputting the charging current to the terminal by the power adaptor.

* * * * *